US009776831B2

(12) United States Patent
Manner et al.

(10) Patent No.: US 9,776,831 B2
(45) Date of Patent: Oct. 3, 2017

(54) PLATFORM ASSEMBLY AND A METHOD FOR MANUFACTURING AN ELEVATOR CAR AND AN ELEVATOR CAR

(71) Applicant: KONE CORPORATION, Helsinki (FI)

(72) Inventors: Timo Manner, Klaukkala (FI); Nithil Karimpanackal Natarajan, Helsinki (FI); Jouni Lappalainen, Jokela (FI); Petri Koli, Hyvinkää (FI); Sami Saarela, Helsinki (FI); Aki Haikonen, Hyvinkää (FI); Vesa Tiainen, Hyvinkää (FI); Pekka Halonen, Tervakoski (FI); Anssi Venho, Hyvinkää (FI); Seppo Kolehmainen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 621 days.

(21) Appl. No.: 14/247,851

(22) Filed: Apr. 8, 2014

(65) Prior Publication Data
US 2014/0311832 A1    Oct. 23, 2014

(30) Foreign Application Priority Data
Apr. 22, 2013    (EP) .................................... 13164645

(51) Int. Cl.
*B66B 11/02*    (2006.01)
*B21D 39/03*    (2006.01)
*F16B 5/00*    (2006.01)

(52) U.S. Cl.
CPC ...... *B66B 11/0226* (2013.01); *B66B 11/0206* (2013.01); *F16B 5/0088* (2013.01); *F16B 5/0036* (2013.01); *Y10T 29/49826* (2015.01)

(58) Field of Classification Search
CPC ............. B66B 11/0226; B66B 11/0253; B66B 11/0206; F16B 5/0088; B21D 39/032; B21D 39/037
See application file for complete search history.

(56) References Cited

U.S. PATENT DOCUMENTS 4,430,838 A * 2/1984 Bains .................. B66B 11/0253
52/584.1
4,700,809 A    10/1987 Lazar
(Continued)

FOREIGN PATENT DOCUMENTS

CN    1241526 A    1/2000
CN    201063137 Y    5/2008
(Continued)

*Primary Examiner* — William A Rivera
*Assistant Examiner* — Stefan Kruer
(74) *Attorney, Agent, or Firm* — Birch, Stewart, Kolasch & Birch, LLP

(57) ABSTRACT

A platform assembly includes a first platform module having an elongated front face, a second platform module having an elongated front face, and a locking member for locking the front faces of the first and second platform modules to each other. The locking member is movably mounted on the first platform module in a longitudinal direction of the front face thereof, and at least one of the locking member and the second platform includes a locking protrusion, and the other of the locking member and the second platform includes a locking slot, wherein the locking protrusion is received by the locking slot and protrudes from the front face of the first platform module. An edge of the locking protrusion is behind an edge of the locking slot when the locking member is moved in said longitudinal direction of the front face, thereby locking the platform modules to each other.

20 Claims, 5 Drawing Sheets

(56) References Cited

U.S. PATENT DOCUMENTS

| | | | |
|---|---|---|---|
| 6,029,778 | A | 2/2000 | Lacarte Estallo |
| 6,123,314 | A | 9/2000 | Steele |
| 6,209,686 | B1 | 4/2001 | Tomasetti et al. |
| 2005/0204764 | A1 | 9/2005 | Lomp |
| 2012/0205199 | A1 | 8/2012 | Brugger et al. |

FOREIGN PATENT DOCUMENTS

| | | |
|---|---|---|
| CN | 201080941 Y | 7/2008 |
| EP | 0 972 738 A1 | 1/2000 |
| FR | 2 974 602 A1 | 11/2012 |

\* cited by examiner

PLATFORM ASSEMBLY AND A METHOD FOR MANUFACTURING AN ELEVATOR CAR AND AN ELEVATOR CAR

FIELD OF THE INVENTION

The invention relates to structure and installation of a platform, in particular to structure and installation of a platform of a car of an elevator which is meant for transporting passengers and/or goods on top of the platform.

BACKGROUND OF THE INVENTION

Elevator cars typically have a platform on top of which passengers and/or goods can be transported. The platform typically forms the load bearing structure of the cabin floor. It may be covered with a decorative panel but this is not always necessary as the platform itself may comprise a decorative surface plate. The cabin is a box-like structure with walls, ceiling, a floor and possibly door(s), which together define the interior space for receiving the load to be transported. The cabin may be a self-carrying structure and form as such the complete elevator car, or alternatively the cabin can be mounted on a car frame via the platform. In prior art, there are numerous different platform solutions. Usually, the platform is installed in one piece. That is, a large platform, which extends across the cabin from one side to the other both in the width-direction and depth-direction, is installed to form the platform of the elevator car. The problem with this type of installation is that the elevator car is difficult and slow to assemble. Large parts are heavy to move and require more space. These problems are met especially when the elevator car is intended to be assembled inside the hoistway. In the aforementioned case, where the platform is mounted in single piece, the platform has been previously assembled in the factory from numerous parts. As some of these known platforms are assembled from several pieces at the factory, it is possible that the platform could be assembled in the hoistway. However, these known platform structures have not been well suitable in practice for being assembled in the hoistway, because an accurate assembly typically requires use of complicated welding equipment and handling of large amount of components. Also such solutions have been proposed where several larger modules are connected to each other in the hoistway to form a platform. However, in the known solutions the modules have been complicated to fix to each other rigidly. In particular, they have not allowed forming of the platform of several smaller platform modules such that the platform modules together form a platform with upper face area which is the sum of the upper face areas of the platform modules.

BRIEF DESCRIPTION OF THE INVENTION

The object of the invention is, inter alia, to solve one or more of the previously described drawbacks of known solutions as well as problems discussed later in the description of the invention. An object of the invention is in particular to introduce a platform assembly which can be assembled in a confided space, quickly and simply with simple tools. An object of the invention is to introduce a method and a car and an elevator with corresponding characteristics. Embodiments are presented, inter alia, where the modules of the platform assembly can be rigidly locked to each other.

It is brought forward a new platform assembly, comprising a first platform module having a planar upper face and an elongated front face, a second platform module having a planar upper face and an elongated front face, a locking member for locking the front faces of the first and second platform modules to each other when they are set against each other, which locking member is movably mounted on the first platform module. The locking member is mounted on the first platform module movably in the longitudinal direction of the front face. At least one of the locking member and the second platform comprises a locking protrusion protruding from the front face of the platform module in question, and the other of the locking member and the second platform comprises a locking slot arranged to receive said locking protrusion when the front faces of the platform modules are set against each other, and in that an edge of the locking protrusion is arranged to move behind an edge of the locking slot when the locking member is moved in said longitudinal direction of the front face, thereby locking the platform modules to each other. Thus, one or more of the aforementioned advantages can be achieved. In particular, the modules of the platform assembly can be rigidly locked to each other. The platform assembly is suitable for forming part of a floor of an elevator car. The mechanism can be used effectively to align elevator car platform modules together tightly, and it's easy to observe the alignment of flooring materials. The platform assembly can be mounted easily on top of the car frame (e.g. on the raw car floor of the car frame). The platform assembly is also fast to install because the fitter can stay on top of floor and doesn't have to go under the car during installation. The locking ensures a high quality top surface for the floor of an elevator car.

In a preferred embodiment both the locking member mounted on the first platform module and the second platform module comprises a locking protrusion protruding from the front face of the platform module in question, and both the locking member mounted on the first platform module and the second platform comprises a locking slot, and the locking slot of the locking member is arranged to receive the locking protrusion of the second platform and the locking slot of the second platform is arranged to receive the locking protrusion of the locking member when the front faces of the platform modules are set against each other, edges of said locking protrusions being arranged to move behind edges of said locking slots when the locking member is moved in the direction of the front face. In this way, a double-locking effect is achieved. Thereby, the modules are reliably locked to each other. The rigidity of the connection is further facilitated and the seam area of the platform can be made unnoticeable, e.g. for the passenger of the car.

In a preferred embodiment, the platform assembly comprises a screw means comprising a screw member, via which screw means the locking member is mounted on the first platform module movably such that the locking member is moved in the longitudinal direction of the front face by rotating the screw member of the screw means. These screw means facilitate accurate, forceful, holding and reliable locking movement easily and with simple tools. Preferably, the rotational axis of the screw member is aligned in the longitudinal direction of the front face. Preferably, the screw means is in the form of a nut-and-bolt-pair.

In a preferred embodiment, an end of the screw member is supported on a side face of the first platform module.

In a preferred embodiment, the first platform module comprises a guide for guiding the movement of the locking member, particularly to take place in the longitudinal direction of the front face as defined. Thus, movability in desired directions only can be facilitated.

In a preferred embodiment, the locking slot of one of the locking member mounted on the first platform module and the second platform module is an elongated opening in the longitudinal direction of the front face of the platform module in question.

In a preferred embodiment, the locking slot of one of the locking member mounted on the first platform module and the second platform module is an elongated opening with a narrowing shape in the longitudinal direction of the front face of the platform module in question, and the protrusion of the other of the locking member mounted on the first platform module and the second platform module is a locking pin with a locking flange at the distal end of it. Thereby, the locking edge formed by the back side of the flange of the locking pin can be moved to lock firmly behind the locking edge of the locking slot formed by the narrow section of the slot. Thus, a firm locking can be achieved simply. Preferably, the locking slot is a keyhole slot with a wide section and a narrow section, the narrow section forming the locking edge of the locking slot.

In a preferred embodiment, the locking slot of one of the locking member mounted on the first platform module and the second platform module is an opening elongated in the longitudinal direction of the front face of the platform module in question, and the protrusion of the other of the locking member mounted on the first platform module and the second platform module is a locking hook with a distal end pointing in longitudinal direction of the front face of the platform module in question. Thus, a firm locking can be achieved simply.

In a preferred embodiment, the locking member is mounted on the back side of a front face plate of the first platform module. The locking protrusion of the locking member extends through an opening formed in the front face plate.

In a preferred embodiment, the modules are preferably rectangular blocks with its six side faces at right angle to each other.

In a preferred embodiment, the locking slot(s) is/are arranged to receive said locking protrusion(s) unblocked when the front faces of the platform modules placed parallel and opposite each other are moved linearly towards each other.

It is also brought forward a new method for manufacturing an elevator car comprising a platform assembly forming part of the floor of the elevator car. The method comprises the steps of providing a platform assembly according to any one of the preceding claims, setting the front faces of the platform modules against each other, and moving the locking member of the platform assembly in longitudinal direction of the front face, thereby locking the platform modules to each other.

In a preferred embodiment of the method, a car frame is mounted in a hoistway and then the platform assembly is mounted on the car frame.

In a preferred embodiment of the method, the platform assembly is mounted on the car frame by setting the platform modules on the frame such that the front faces of the modules are spaced apart opposite each other and parallel and then moving them linearly towards each other.

It is also brought forward a new elevator car, which is obtained by a method as described above or elsewhere in the application. Thus an elevator car is obtained with advantages as earlier described.

It is also brought forward a new elevator car, which comprises a platform assembly forming part of the floor of the elevator car. The platform assembly is as described above or elsewhere in the application. Thus an elevator car is obtained with advantages as earlier described.

It is also brought forward a new elevator, which comprises the elevator car as above described. Thus an elevator is obtained with advantages as earlier described.

In the preferred embodiment each of the modules comprises a planar upper face. When the front faces of the platform modules are set against each other, their upper faces are coplanar. When the platform modules are locked to each other as above described, the upper faces form together a platform with upper face area which is the sum of the upper face areas of the first and second platform modules. Each upper face is preferably a continuous planar upper surface of the module in question. In that case, the upper face can be formed by a continuous upper surface face plate. However, it is not necessary that the upper faces are continuous. The planar upper faces of the platform modules may form the (visible) car floor surface or alternatively they can support a plate or plates forming the (visible) car floor surface.

The elevator as described anywhere above is preferably, but not necessarily, installed inside a building. The elevator is preferably of the type where the car is arranged to serve two or more landings. Then, the car preferably responds to calls from landing and/or destination commands from inside the car so as to serve persons on the landing(s) and/or inside the elevator car. Preferably, the car has an interior space suitable for receiving a passenger or passengers. The car may be provided with a floor, a ceiling, walls and at least one door these all forming together a closable and openable interior space. In this way, it is well suitable for serving passengers.

BRIEF DESCRIPTION OF THE DRAWINGS

In the following, the present invention will be described in more detail by way of example and with reference to the attached drawings, in which.

DETAILED DESCRIPTION

Figure 1:
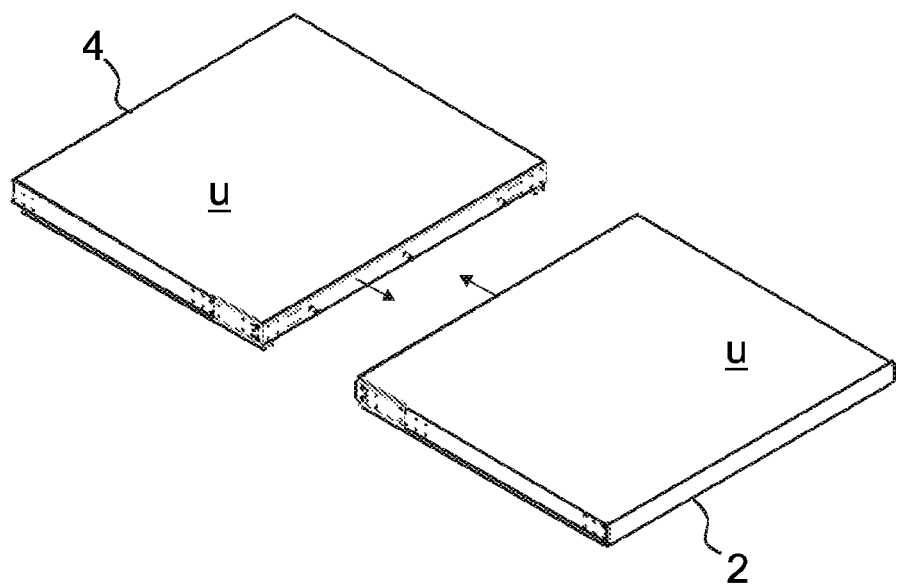
FIG. 1 illustrates three-dimensionally platform modules of the platform assembly in a non-assembled state.

FIG. 1 illustrates a platform assembly 1 in a non-assembled state, i.e. in a state where its platform modules are not yet locked to each other. The platform assembly 1 comprises a first platform module 2 having a planar upper face u, and an elongated front face 3 forming an elongated flank of the first platform module 2. The platform assembly 1 further comprises a second platform module 4 having a planar upper face u, and an elongated front face 5 forming an elongated flank of the second platform module 4.

Figure 2:
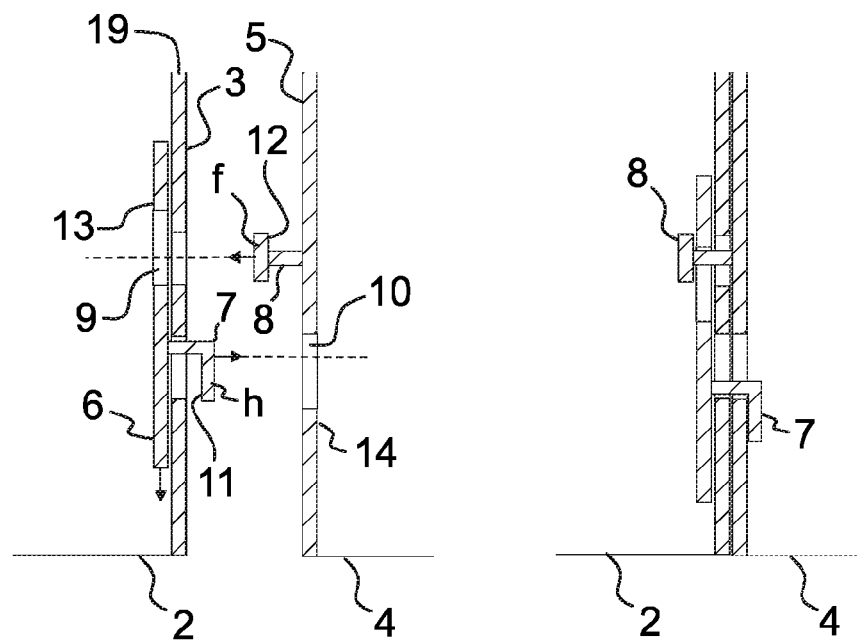
FIG. 2 illustrates schematically the locking mechanism for locking the platform modules to each other.
Figure 7:
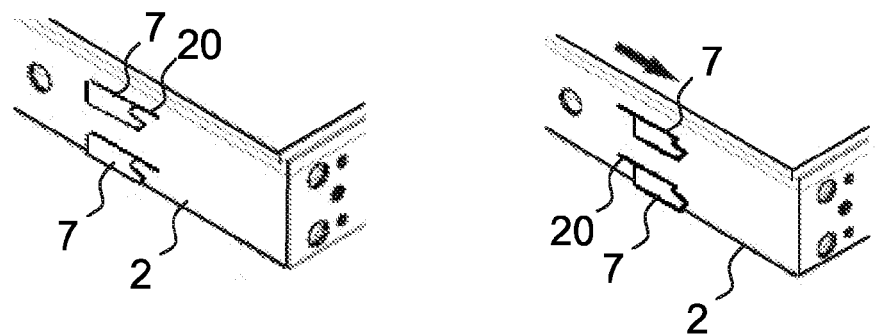
FIG. 7 illustrates three-dimensionally movement of the locking member.
Figure 8:
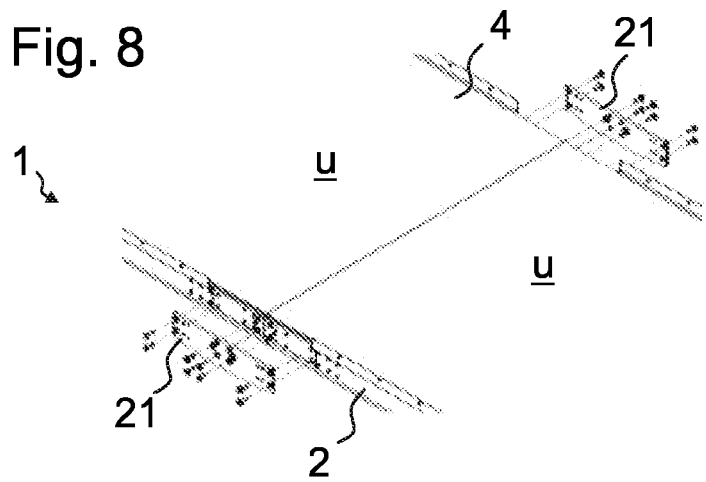
FIG. 8 illustrates three-dimensionally the platform assembly in a assembled state.

The platform assembly 1 further comprises a locking member 6, illustrated in FIG. 2, for locking the front faces 3, 5 of the first and second platform modules 2, 4 to each other when they are set against each other. The locking member 6 is movably mounted on the first platform module 2 to be moved with a movement for locking from a released position to a locking position and vice versa. More specifically, the locking member 6 is mounted on the first platform module 2 movably in the longitudinal direction of the front face 3. This direction is additionally parallel with the upper face u of the first platform module 2. The locking movement is illustrated in details in FIGS. 3 and 7.

Both the locking member 6 mounted on the first platform module 2 and the second platform module 4 comprises a locking protrusion 7, 8 protruding from the front face 3, 4 of the platform module in question. The locking member 6 mounted on the first platform module 2 comprises a locking slot 9 arranged to receive the locking protrusion 8 protruding from the front face 3, 4 of the second platform module 4 when the front faces (3,5) of the platform modules (2,4) are set against each other. Respectively, the second platform module 4 comprises a locking slot 10 arranged to receive the locking protrusion 7 protruding from the front face 3 of the first platform module 2 when the front faces 3, 5 of the platform modules 2, 4 are set against each other. The slots 9, 10 are positioned such that the protrusions 7, 8 are received by the slots unblocked by the edge(s) of the slots when the modules 2 and 4 are brought together. The modules are formed such that their protrusions 7,8 and slots 9,10 are aligned, when the modules 2, 4 are placed such that their front faces 3, 5 are parallel and placed opposite each other and at a distance from each other. When the modules are set against each other, the protrusions 7,8 extend all the way through the slots 9,10.

The locking protrusion 8 of the second platform module 4 comprises and edge 12 arranged to move relative to the slot 9 behind an edge 13 (i.e. to be positioned on the back side of the edge 13) of the locking slot 9 of the locking member 6 when the locking member 6 is moved in said longitudinal direction of the front face, thereby locking the platform modules to each other. A double locking effect is achieved, because the locking protrusion 7 of the locking member 6 comprises and edge 11 arranged to move relative to the slot 10 behind (i.e. to be positioned on the back side of) an edge 14 of the locking slot 10 of the locking member 6 when the locking member 6 is moved in said longitudinal direction of the front face, thereby locking the platform modules 2, 4 to each other.

For producing the movement of the locking member 6 in the longitudinal direction of the front face, the platform assembly 1 comprises a screw means 15,16, comprising a screw member 15, via which screw means the locking member 6 is mounted on the first platform module 2 such that the locking member 6 is moved in the longitudinal direction of the front face by rotating the screw member 15 of the screw means 15,16. In this way, a simple, strong and reliable locking can be achieved. Also, a releasing movement, working in a way opposite to the locking movement, can be achieved should releasing be later needed. The rotational axis of the screw member 15 is aligned in the longitudinal direction of the front face. The screw means 15,16 is in the preferred embodiment in the form of a nut-and-bolt-pair, the screw member 15 being in the form of a bolt. The bolt 15 has one end supported on the first platform module 2 via the bolt head and a second end supported on the locking member 6 via a nut 16. The nut can be integral with the locking member 6 (such as welded to it), but this is not necessary. Alternatively, the nut and bolt could be in opposite order, the bolt having one end supported on the first platform module 2 via a nut and a second end supported on the locking member 6 via the bolt head. Rotation of the bolt 15 relative to the nut causes the nut end and the bolt head to move relative to each other in the longitudinal direction of the front face. Thereby, the locking member 6 can be moved between the locking position and released position.

Figure 3:
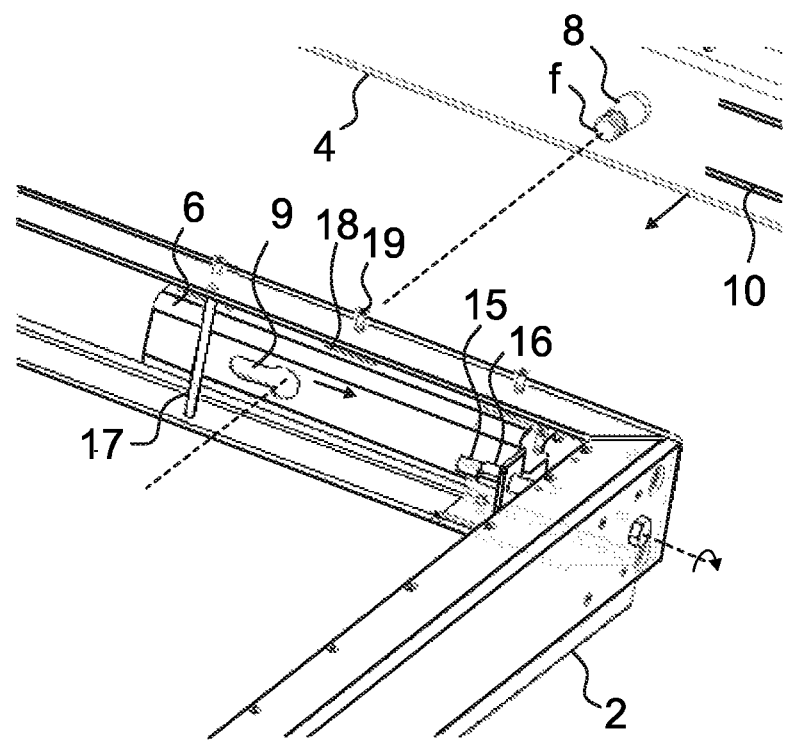
FIG. 3 illustrates three-dimensionally the platform modules and the locking member and their movement relative to each other to achieve locking.
Figure 4:
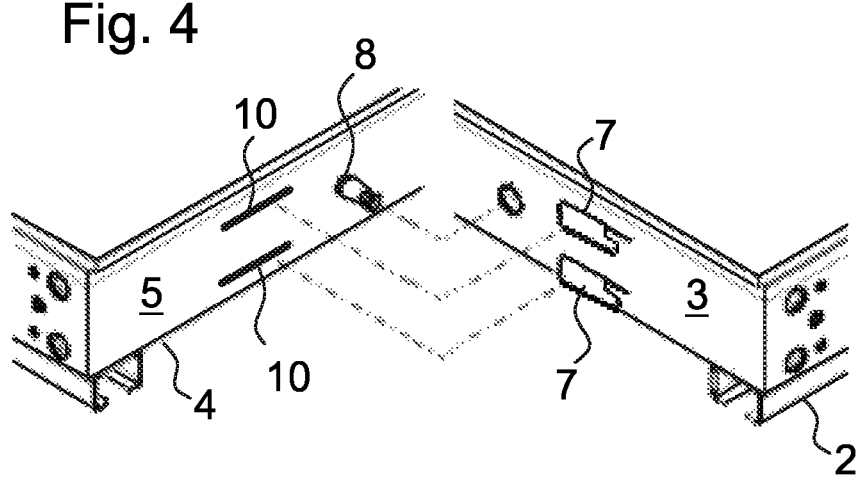
FIG. 4 illustrates three-dimensionally the front faces of the platform modules and how they fit together.
Figure 5:
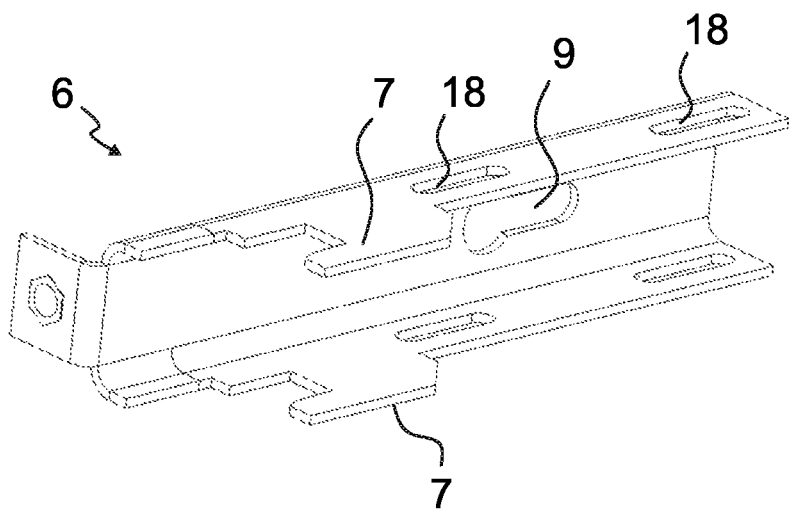
FIG. 5 illustrates three-dimensionally the back side of the locking member.
Figure 6:
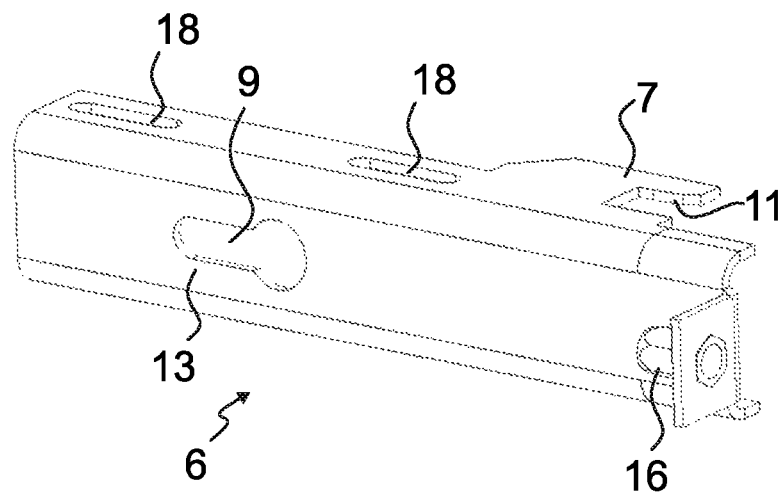
FIG. 6 illustrates three-dimensionally the front side of the locking member.

In the preferred embodiment, the bolt 15 has one end supported on a side face of the first platform module 2 via the bolt head as illustrated in FIG. 3 for instance. Thereby, the locking movement can be produced without putting rotating tools inside the platform module 2. Thus, the platform module can have its upper surface plate installed prior the locking. On the other hand, the nut and bolt could be in opposite order, which would facilitate installing in tight space, particularly because then the locking movement can be produced without putting rotating tools beside the platform module 2. Then, the platform module should have its upper surface plate installed prior the locking.

For ensuring controlled movement, the first platform module 2 comprises a guide 17 for guiding the movement of the locking member 6. In the preferred embodiment the guide 17 comprise a guiding pin 17 along which the locking member 6 can move. The locking member is positioned between the face plate of the first platform module 2 and the guiding pin 17. The locking member 6 further comprises guide grooves 18 elongated in longitudinal direction of the front face and locking pins 19 extending into the guide grooves 18. Thus, when the locking member 6 moves right in FIG. 3, the guide groove 18 moves right and the locking pins 19 stay stationary and stop the guide groove 18 and thereby the locking member 6 from moving sideways relative to the longitudinal direction of the front face.

In the preferred embodiment, the locking slot 9 of the locking member 6 is an opening elongated in longitudinal direction of the of the front face and with a shape narrowing in the longitudinal direction of the front face 3. The slot 9 opens in the front direction of the platform module 2 and comprises locking edges 13. The protrusion 8 of the second platform module is a locking pin with a locking flange f at the distal end of it, the flange forming said locking edge 12 which is arranged to move behind the locking edge 13 of the locking slot 9. In particular, the locking slot 9 of the locking member 6 is a keyhole slot, elongated in longitudinal direction of the of the front face, with a wide section and a narrow section, the narrow section forming said locking edges 13 of the locking slot 9. The wide section is wide enough to allow the locking pin 8 to move through it. Thus, a movement in the longitudinal direction of the front face 3, when the locking protrusion 8 is in the locking slot 9 subsequent the setting of the front faces 3, 5 against each other, will move the edge 12 of the flange f behind the edge 13 of the slot 9.

The locking slot 10 of the second platform module 4 is an opening elongated in longitudinal direction of the of the front face 5. The slot 10 opens in the front direction of the platform module 4 and comprises locking edges 12. The protrusion 7 of the locking member 6 is a locking hook h with a distal end pointing in longitudinal direction of the front faces 3, 5 when they are set against each other. The distal end forms the locking edge 11 which is arranged to move behind the locking edge 14 of the locking slot 10 of the second platform module 4. A movement in the longitudinal direction of the front face 3, when the locking protrusion 7 is in the locking slot 10 subsequent the setting of the front faces 3, 5 against each other, will move the edge 11 of the hook h behind the edge 14 of the slot 10. The hook-like protrusion 7 of the locking member 6 is in the preferred embodiment made of a plate parallel with the upper face of the first platform module. Thus, it can be formed with a simple structure to be rigid and effectively resisting the forces exerted on it if the modules are being pulled apart.

As illustrated in Figures, each of the platform modules 2, 4 comprises a face plate forming the front face 3, 5 of the platform module 2, 4. In the preferred embodiment. The locking member 6 is mounted on the back side of a front face plate 19 of the first platform 2 and the locking protrusion 7 of the locking member 6 extends through an opening 20 formed in the front face plate 19. Respectively, the locking protrusion 8 of the second platform module 4 extends through an opening formed in the front face plate thereof.

FIGS. 1, 2, 3 and 7 illustrate with arrows how the modules and the locking member are moved relative each other in the method step for locking the modules 2, 4 together. First the modules 2, 4 are placed such that their front faces 3, 5 are parallel and placed opposite each other, at a distance from each other. The modules 2, 4 are formed such that their protrusions 7,8 and slots 9,10 are aligned, when the modules 2, 4 are placed this way. After that, they are moved linearly towards each other keeping the front faces 3, 5 parallel. The locking slots 9, 10 are with this kind of movement arranged to receive said locking protrusions 7, 8, i.e. the protrusions 7, 8 move unblocked into the slots 9, 10. After that, the locking member 6 is moved linearly in the direction of the front face 3 of the first module 2, which correspond to the direction of the front face 5 of the second module 4 as they are parallel. Thus the edge 11 of the locking protrusion 7 moves move relative to the slot 10 to be positioned) behind the edge 14 of the locking slot 10, and the edge 12 of the locking protrusion 8 moves relative to the slot 9 to be positioned behind the edge 13 of the locking slot 9. The edges 13 and 14 keep the edges 11 and 12 from moving away from the slot and thereby the platform modules 2 and 4 are locked to each other.

When the front faces 3, 5 of the first and second platform modules 2, 4 are set against each other, the upper faces of the modules 2, 4 are coplanar and form together a platform with upper face area which is the sum of the upper face areas of the first and second platform modules. Each of the upper faces and is preferably a continuous upper surface of the module in question. The upper faces are planar but they need not necessarily be continuous upper surfaces because a plate can be later installed on a noncontinuously planar upper face of each module to cover it and thereby to form a continuous upper surface plate for the module 2, 4, or alternatively a plate could be installed commonly on the planar upper faces of the modules to cover them and thereby to form a continuous upper surface plate for the modules 2, 4.

Figure 9:
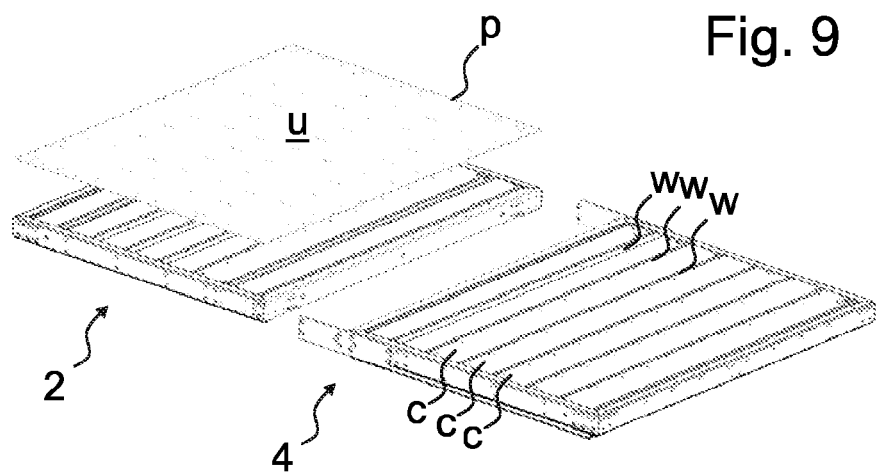
FIG. 9 illustrates three-dimensionally internal structure of the platform modules.

FIG. 9, illustrates further preferred details of the modules 2, 4. Each module comprises a upper surface plate p (shown only for module 2) forming a continuous upper surface u of the module in question. Each module 2,4 is preferably formed to be a sandwich structure. The sandwich structure comprises in the preferred embodiment plurality of core walls w extending from one side to the other parallelly inside the module and forming plurality of elongated channels between them. In addition to the locking, the platform modules 2, 4 can (optionally) be fixed to each other with one or more side plate 21 fixed to a side flank of each module and extending over the seam of the modules 2, 4. The side plate(s) provided to resist excessive shearing loads.

Figure 10:
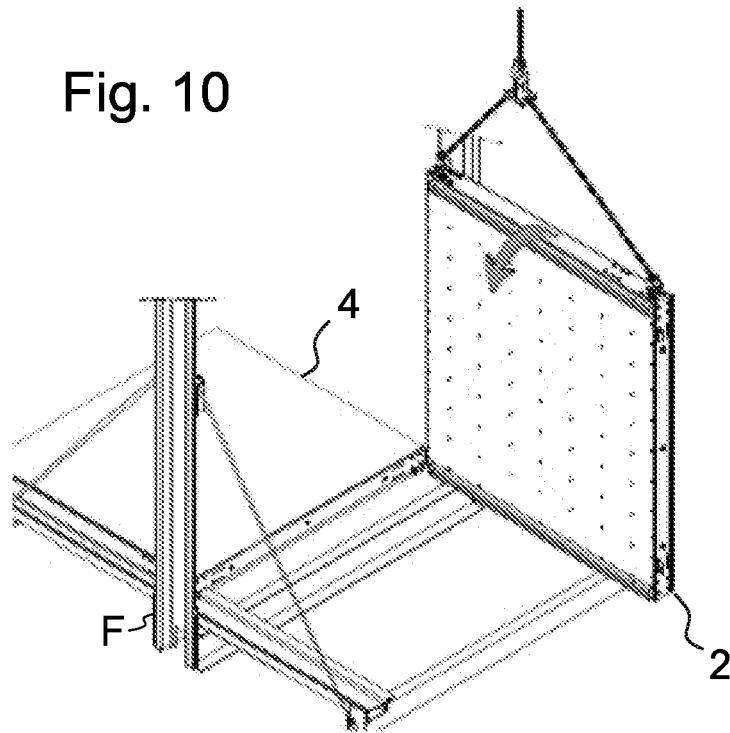
FIG. 10 illustrates three-dimensionally a step of method for manufacturing an elevator car.
Figure 11:
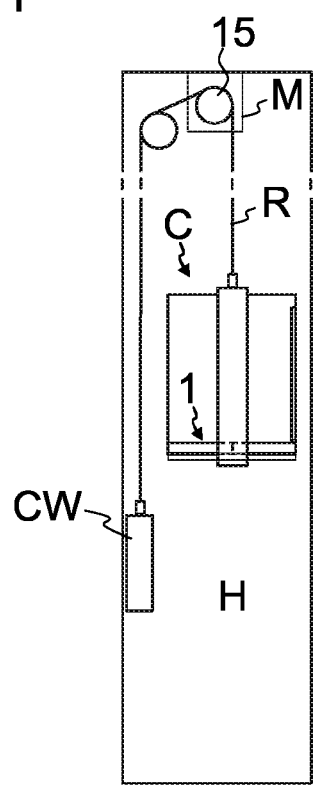
FIG. 11 illustrates a side view of an elevator which comprises an embodiment of an elevator car with the platform assembly.

FIG. 10 illustrates a method for manufacturing an elevator car C comprising a platform assembly 1. The elevator and the completed elevator car C thereof is illustrated in FIG. 11. In the method first a platform assembly 1 is provided, which is as earlier described and illustrated with reference to FIGS. 1-9. Then the front faces 3, 5 of the platform modules 2, 4 are set against each other, and then the locking member 6 of the platform assembly 1 is moved in longitudinal direction of the front face 3 of the first platform module 2, thereby locking the platform modules to each other. Particularly, it is preferable that the car frame F is first mounted in a hoistway and then the platform assembly is mounted on the car frame F. In this case, the platform assembly 1 is mounted on the car frame F by setting the second platform module 4 on the frame F and then setting the first platform module 2 on the frame F such that the front faces 3, 5 of the modules are spaced apart opposite each other and parallel and then moving them linearly towards each other. The platform module 1 can be fixed to the frame F e.g. after the locking.

FIG. 11 illustrates an elevator manufactured by the method and comprising the platform assembly 1 as elsewhere described. The elevator comprises a hoistway S, an elevator car 1 and a counterweight CW vertically movable in the hoistway S, and a drive machine which drives the elevator car 1 under control of an elevator control system (not shown). The drive machine comprises a motor M and a traction sheave 15, which engages elevator ropes R, which ropes R are connected to the elevator car C. The ropes R connect the elevator car 1 and the counterweight CW and pass around the traction sheave 15. Thus, driving force can be transmitted from the motor M to the car C via the traction sheave 15 and the ropes R.

In the preferred embodiment one of the protrusions is a locking pin and one is a locking hook and the corresponding slots are configured suitably to receive them lockably. It is however, not necessary that the protrusions are different as they could alternatively be similar to each other either in the form of a locking hooks or a locking pins the slots then being configured suitably to receive this particular type of protrusion lockably.

A double locking effect is advantageous to achieve firm locking of the platform modules together, but this is not necessary as alternatively the platform assembly could be formed such that only one of the locking member mounted on the first platform module and the second platform comprises a locking protrusion protruding from the front face of the platform module in question, and the other of the locking member mounted on the first platform module and the second platform comprises a locking slot arranged to receive said locking protrusion when the front faces of the platform modules are set against each other, wherein an edge of the locking protrusion is arranged to move behind an edge of the locking slot when the locking member is moved in said longitudinal direction of the front face, thereby locking the platform modules to each other.

The first platform module can have plurality members and the second platform plurality of corresponding locking slots/protrusions. The locking member is in the preferred embodiment formed such that it comprises two superposed protrusions 7. The front face plate 19 comprises an opening per each of these two protrusions. The second platform module comprises a slot per each of these two protrusions with the structure as already earlier described. The interposed configuration facilitates the rigidity of the locking further, in particular reducing the tilting of the modules relative to each other in the seam area.

The modules 2, 4 are preferably prefabricated rectangular blocks. Thus, they have been prefabricated at the factory and brought to the installation site in this form.

It is to be understood that the above description and the accompanying Figures are only intended to illustrate the present invention. It will be apparent to a person skilled in the art that the inventive concept can be implemented in various ways. The invention and its embodiments are not limited to the examples described above but may vary within the scope of the claims.

The invention claimed is:

1. A platform assembly, comprising:
   a first platform module having an elongated front face and a rear face opposite the front face;
   a second platform module having an elongated front face; and
   a locking member for locking the front faces of the first and second platform modules to each other when they are set against each other,
   wherein the locking member is mounted on the first platform module movably in a longitudinal direction of the front face of the first platform module, wherein the locking member comprises a front face,
   wherein at least one of the locking member and the second platform module comprises a locking protrusion protruding from the front face of the at least one of the locking member and the second platform module, respectively, and the other of the at least one of the locking member and the second platform module comprises a locking slot arranged to receive said locking protrusion when the front faces of the first and second platform modules are set against each other, and
   wherein the locking protrusion extends through the front and rear faces of the first platform module and an edge of the locking protrusion is behind an edge of the locking slot as a result of the locking member having been moved in said longitudinal direction of the front face of the first platform module, thereby locking the first and second platform modules to each other.

2. The platform assembly according to claim 1, wherein each of the locking member and the second platform module comprise a locking protrusion protruding from the front face thereof, and wherein both the locking member and the second platform module comprises a locking slot, and wherein the locking slot of the locking member is arranged to receive the locking protrusion of the second platform and the locking slot of the second platform is arranged to receive the locking protrusion of the locking member when the front faces of the first and second platform modules are set against each other, and wherein edges of said locking protrusions are behind the edges of said locking slots as a result of the locking member having been moved in the longitudinal direction of the front face of the first platform module.

3. The platform assembly according to claim 2, further comprising a screw comprising a screw member, via which screw the locking member is movably mounted on the first platform module,
   wherein the locking member is moved in the longitudinal direction of the front face of the first platform module by rotating the screw member of the screw.

4. The platform assembly according to claim 3, wherein a rotational axis of the screw member is aligned in the longitudinal direction of the front face.

5. The platform assembly according to claim 2, wherein the first platform module comprises a guide for guiding the movement of the locking member.

6. The platform assembly according to claim 1, further comprising a screw comprising a screw member, via which screw the locking member is movably mounted on the first platform module,
   wherein the locking member is moved in the longitudinal direction of the front face by rotating the screw member of the screw.

7. The platform assembly according to claim 6, wherein a rotational axis of the screw member is aligned in the longitudinal direction of the front face.

8. The platform assembly according to claim 6, wherein the first platform module comprises a guide for guiding the movement of the locking member.

9. The platform assembly according to claim 1, wherein a rotational axis of the screw member is aligned in the longitudinal direction of the front face of the first platform module.

10. The platform assembly according to claim 1, wherein the first platform module comprises a guide for guiding the movement of the locking member.

11. The platform assembly according to claim 1, wherein the locking slot of at least one of the locking member and the second platform module is an elongated opening in the longitudinal direction of the front face of the first platform module.

12. The platform assembly according to claim 1, wherein the locking slot of one of the locking member and the second platform module is an elongated opening with a narrowing shape in the longitudinal direction of the front face of the first platform module, and the protrusion of the other of the locking member and the second platform module is a locking pin with a locking flange at a distal end thereof.

13. The platform assembly according to claim 1, wherein the locking slot is a keyhole slot with a wide section and a narrow section, the narrow section forming a locking edge of the locking slot.

14. The platform assembly according to claim 1, wherein the locking slot of one of the locking member and the second platform module is an opening elongated in the longitudinal direction of the front face of the first platform module, and the protrusion of the other of the locking member and the second platform module is a locking hook with a distal end pointing in longitudinal direction of the front face of the respective platform module.

15. The platform assembly according to claim 1, wherein the locking member is mounted on the back side of a front face plate of the first platform module.

16. The platform assembly according to claim 1, wherein the locking slot(s) is/are arranged to receive said locking protrusion(s) unblocked when the front faces of the platform modules placed parallel and opposite each other are moved linearly towards each other.

17. A method for manufacturing an elevator car wherein the method comprises the steps of:
   providing the first platform module, the second platform module and the locking member according to claim 1;
   setting the front faces of the first and second platform modules against each other; and
   moving the locking member in the longitudinal direction of the front face of the first platform module thereby locking the first and second platform modules to each other.

18. The method for manufacturing an elevator car according to claim 17, wherein a car frame is mounted in a hoistway and then the platform assembly is mounted on the car frame.

19. The method for manufacturing an elevator car according to claim 17, wherein the platform assembly is mounted on a car frame by setting the first and second platform modules on the frame, where the front faces of the first and second modules are spaced apart opposite each other and are parallel and then moving the first and second modules linearly towards each other.

20. An elevator car, comprising a platform assembly, wherein the elevator car is obtained by a method according to claim 17.

* * * * *